US009671892B2

(12) United States Patent
Jang

(10) Patent No.: US 9,671,892 B2
(45) Date of Patent: Jun. 6, 2017

(54) INPUT APPARATUS, DISPLAY APPARATUS AND CONTROL METHOD THEREOF WHICH RECEIVES AN INPUT TO AN INPUT AREA OF THE INPUT APPARATUS WHICH IS DIVIDED INTO A PLURALITY OF AREAS BY USING THE INPUT APPARATUS INCLUDING A TOUCH SENSOR

(71) Applicant: SAMSUNG ELECTRONICS CO., LTD., Suwon-si (KR)

(72) Inventor: Bong-ki Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/120,263

(22) Filed: May 14, 2014

(65) Prior Publication Data
US 2014/0340323 A1   Nov. 20, 2014

(30) Foreign Application Priority Data

May 14, 2013 (KR) .................. 10-2013-0054359

(51) Int. Cl.
G06F 3/041 (2006.01)
H04N 21/422 (2011.01)
G06F 3/0488 (2013.01)

(52) U.S. Cl.
CPC ........ *G06F 3/0416* (2013.01); *G06F 3/04883* (2013.01); *G06F 3/04886* (2013.01); *H04N 21/42224* (2013.01)

(58) Field of Classification Search
None
See application file for complete search history.

(56) References Cited

U.S. PATENT DOCUMENTS

| 7,958,447 | B2 | 6/2011 | Meserth et al. | |
|---|---|---|---|---|
| 2006/0238517 | A1* | 10/2006 | King | G06F 1/1626 345/173 |
| 2010/0277337 | A1* | 11/2010 | Brodersen | G06F 3/04883 340/12.54 |
| 2011/0141050 | A1* | 6/2011 | Miura | G06F 3/04883 345/173 |
| 2012/0026109 | A1 | 2/2012 | Baba | |

(Continued)

FOREIGN PATENT DOCUMENTS

| JP | 2006-211104 A | 8/2006 |
|---|---|---|
| KR | 10-2008-0028672 A | 4/2008 |

(Continued)

*Primary Examiner* — Ryan A Lubit
(74) *Attorney, Agent, or Firm* — Sughrue Mion, PLLC

(57) ABSTRACT

An input apparatus, a display apparatus and a control method thereof are provided. The input apparatus includes a communication transceiver which is configured to communicate with the display apparatus; a touch sensor which is configured to receive a touch input; and a controller which is configured to divide an input area of the touch sensor into a plurality of areas, and in response to the touch sensor receiving a touch input that ends in at least one setting area of the plurality of areas, sense a change in one of coordinate values X and Y with respect to the received touch input, and control the communication transceiver to transmit a command to the display apparatus corresponding to the sensed change.

18 Claims, 17 Drawing Sheets

(56) References Cited

U.S. PATENT DOCUMENTS

| | | | |
|---|---|---|---|
| 2013/0019205 A1* | 1/2013 | Gil | G06F 3/04812 715/834 |
| 2013/0067397 A1* | 3/2013 | Kirschner | G06F 3/04883 715/799 |
| 2013/0222703 A1* | 8/2013 | Yarita | G06F 3/0488 348/734 |
| 2013/0239031 A1* | 9/2013 | Ubillos | H04L 51/24 715/765 |
| 2014/0218289 A1* | 8/2014 | Dai | H04M 1/72533 345/157 |
| 2014/0267932 A1* | 9/2014 | Riddell | H04N 5/4403 348/734 |
| 2014/0300559 A1* | 10/2014 | Tanimoto | G06F 3/0416 345/173 |

FOREIGN PATENT DOCUMENTS

| | | |
|---|---|---|
| KR | 10-0826194 B1 | 4/2008 |
| KR | 10-2008-0041809 A | 5/2008 |
| KR | 10-2012-0022973 A | 3/2012 |

\* cited by examiner

INPUT APPARATUS, DISPLAY APPARATUS AND CONTROL METHOD THEREOF WHICH RECEIVES AN INPUT TO AN INPUT AREA OF THE INPUT APPARATUS WHICH IS DIVIDED INTO A PLURALITY OF AREAS BY USING THE INPUT APPARATUS INCLUDING A TOUCH SENSOR

CROSS-REFERENCE TO RELATED APPLICATION

This application claims priority from Korean Patent Application No. 10-2013-0054359, filed on May 14, 2013 in the Korean Intellectual Property Office, the disclosure of which is incorporated herein by reference.

BACKGROUND

Field

Apparatuses and methods consistent with the exemplary embodiments relate to an input apparatus, a display apparatus and a control method thereof, and more particularly, to an input apparatus, a display apparatus and a control method thereof which receives a user's input by using the input apparatus including a touch sensor.

Description of the Related Art

A display system displays an image based on an image signal transmitted from an external source or generated within the display system itself. Various types of apparatuses may be combined into the display system depending on functions to be performed. For example, the display system may include a display apparatus, and an input apparatus, such as a remote controller, for transmitting various commands to the display apparatus.

The input apparatus may include, for example, a touch sensor to sense a user's touch input. Generally, the touch input apparatus may set coordinates in an input area of the touch sensor and calculate coordinates of the location where the touch input is made to thereby transmit the calculated coordinates information as a predetermined command to the display apparatus.

Since control commands for the display apparatus which may be given through the remote controller are limited to moving cursors and pointing, there is a need to provide an improved input apparatus through which various types of user inputs can be made.

SUMMARY

According to an aspect of an exemplary embodiment, there is provided an input apparatus of a display apparatus, the input apparatus including a communication transceiver that is configured to communicate with the display apparatus; a touch sensor that is configured to receive a touch input; and a controller that is configured to divide an input area of the touch sensor into a plurality of areas, and in response to the touch sensor receiving a touch input in at least one setting area of the plurality of areas, senses a change in one of coordinate values X and Y with respect to the received touch input, and controls the communication transceiver to transmit a command to the display apparatus corresponding to the sensed change.

The setting area may include a first area, a second area, a third area, and a fourth area located respectively at a top, a bottom, a left and a right side of the input area.

The controller may be configured to sense an increase or decrease in the coordinate value X in response to the touch sensor receiving a touch input in the first area or the second area.

The controller may be configured to sense an increase or decrease in the coordinate value Y in response to the touch sensor receiving a touch input in the third area or the fourth area.

The controller may be configured to control the communication transceiver to transmit a command for moving a web page to a previous page in response to the touch sensor receiving a touch input in the first area, or to a next page in response to the touch sensor receiving a touch input in the second area, and to transmit a command for scrolling the web page up in response to the touch sensor receiving a touch input in the third area, or for scrolling the web page down in response to the touch sensor receiving a touch input in the fourth area.

The controller may be configured to control the communication transceiver to transmit a command for moving a setting menu of the display apparatus in response to the touch sensor receiving a touch input in the first area, the second area, the third area, or the fourth area.

The input apparatus may further include a storage that is configured to store setting information of the setting area, wherein the controller is configured to a change in one of the coordinate values X and Y in response to the touch sensor receiving the touch input in a setting area, according to the setting information of the setting area.

The touch input may include a drag input that comprises a press on the input area of the touch sensor, a move across the input area while maintaining pressure in the input area of the touch sensor, and releasing the press at a touch point at an end of the move, and the controller senses a change in one of the coordinate values X and Y corresponding to the setting information of the setting area comprising the touch point of the press.

The setting area may further include a fifth area, a sixth area, a seventh area, and an eighth area which are located respectively at corners of the input area, each of the fifth to eighth areas being formed by overlapping portions of two of the first to fourth areas which adjoin the area.

The input area may further include at least one normal area, and the controller may sense a change in both the coordinate values X and Y in response to receiving a touch input in the normal area.

The normal area may be located at a center of the input area.

The normal area may further comprise a fifth area, a sixth area, a seventh area, and an eighth area which are located respectively at corners of the input area, each of the fifth to eighth areas being formed by overlapping portions of two of the first to fourth areas which adjoin the area.

According to an aspect of another exemplary embodiment, there is provided a display apparatus comprising a display that is configured to display an image thereon; a communication transceiver that is configured to communicate with an input apparatus comprising a touch sensor that is configured to receive a touch input; and a controller that is configured to control the communication transceiver to receive a command from the input apparatus corresponding to a change in one of coordinate values X and Y in response to the touch sensor receiving a touch input in at least one setting area of a plurality of areas into which an input area of the touch sensor is divided, and control the display to display an image thereon corresponding to the received command.

The received command may correspond to an increase or decrease in one of the coordinate values X and Y of the setting area at which the received touch input ends.

The display may be configured to display a web page thereon, and the controller may control the display to move the web page to a previous page in response to the communication transceiver receiving a command for decreasing the coordinate value X, or a next page in response to a received command for increasing the coordinate value X, or to scroll the web page up in response to the communication transceiver receiving a command for increasing the coordinate value Y, or to scroll the web page down in response to the communication transceiver receiving a command for decreasing the coordinate value Y.

The display may be configured to display a setting menu of the display apparatus, and the controller may control the display to move and display the setting menu corresponding to a command for increasing or decreasing one of the coordinate values X and Y.

According to an aspect of another exemplary embodiment, there is provided a control method of an input apparatus of a display apparatus, the control method comprising receiving a touch input in at least one setting area of a plurality of areas into which an input area of a touch sensor is divided; sensing a change in one of coordinate values X and Y in response to receiving the touch input; and transmitting a command to the display apparatus corresponding to the changed coordinate value.

The setting area may comprises a first area, a second area, a third area, and a fourth area located respectively at a top, a bottom, a left and a right side of the input area, and the sensing the changed value comprises sensing an increase or decrease of the coordinate value X in response to receiving a touch input in the first area or the second area.

The sensing the changed value may comprise sensing an increase or decrease in the coordinate value Y in response to receiving a touch input in the third area or the fourth area.

The transmitting the command may comprise transmitting a command for moving a web page to a previous page in response to receiving a touch input in the first area, or to a next page in response to receiving a touch input in the second area, or transmitting a command for scrolling the web page up in response to receiving a touch input in the third area, or for scrolling the web page down in response to receiving a touch input in the fourth area.

The transmitting the command may comprise transmitting a command for moving a setting menu of the display apparatus in response to receiving a touch input in the first area, the second area, the third area, or the fourth area.

The sensing the changed value may comprise sensing a change in one of the coordinate values X and Y in response to receiving the touch input in a setting area according to setting information stored in advance for the setting area.

The touch input may comprises a drag input that comprises a press on the input area of the touch sensor, a move across the input area while maintaining pressure in the input area of the touch sensor, and a release of the press at a touch point at an end of the move, and the sensing the changed value may comprise sensing a change in one of the coordinate values X and Y corresponding to the setting information of the setting area comprising the touch point of the press.

The setting area may further comprise a fifth area, a sixth area, a seventh area, and an eighth area which are located respectively at corners of the input area, each of the fifth to eighth areas being formed by overlapping portions of two of the first to fourth areas which adjoin the area, and the sensing the changed value may comprise sensing an increase or decrease in one of the coordinate values X and Y in response to receiving a touch input in one of the fifth to eighth areas.

The input area may further comprise at least one normal area, and the sensing the changed value may comprise sensing a change in both the coordinate values X and Y in response to receiving a touch input in the normal area.

The normal area may be located in a center of the input area, and the normal area may further comprise a fifth area, a sixth area, a seventh area, and an eighth area which are located respectively at corners of the input area, each of the fifth to eighth areas being formed by overlapping portions of two of the first to fourth areas which adjoin the area.

According to an aspect of another exemplary embodiment, there is provided a control method of a display apparatus which communicates with an input, the control method comprising a touch sensor for receiving a touch input, the control method comprising receiving a command from the input apparatus corresponding to a change in one of coordinate values X and Y in response to receiving a touch input in at least one setting area of a plurality of areas into which an input area of the touch sensor is divided; and displaying an image corresponding to the received command.

The receiving the command may comprise receiving a command corresponding to an increase or decrease in one of coordinate values X and Y according to the setting area in which the received touch input ends.

The displaying the image may comprise moving a web page to a previous page in response to receiving a command for decreasing the coordinate value X, or to a next page in response to receiving a command for increasing the coordinate value X; or scrolling the web page up in response to receiving a command for increasing the coordinate value Y, or scrolling the web page down in response to receiving a command for decreasing the coordinate value Y.

The displaying the image may comprise moving and displaying a setting menu of the display apparatus in response to receiving a command for increasing or decreasing one of the coordinate values X and Y.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
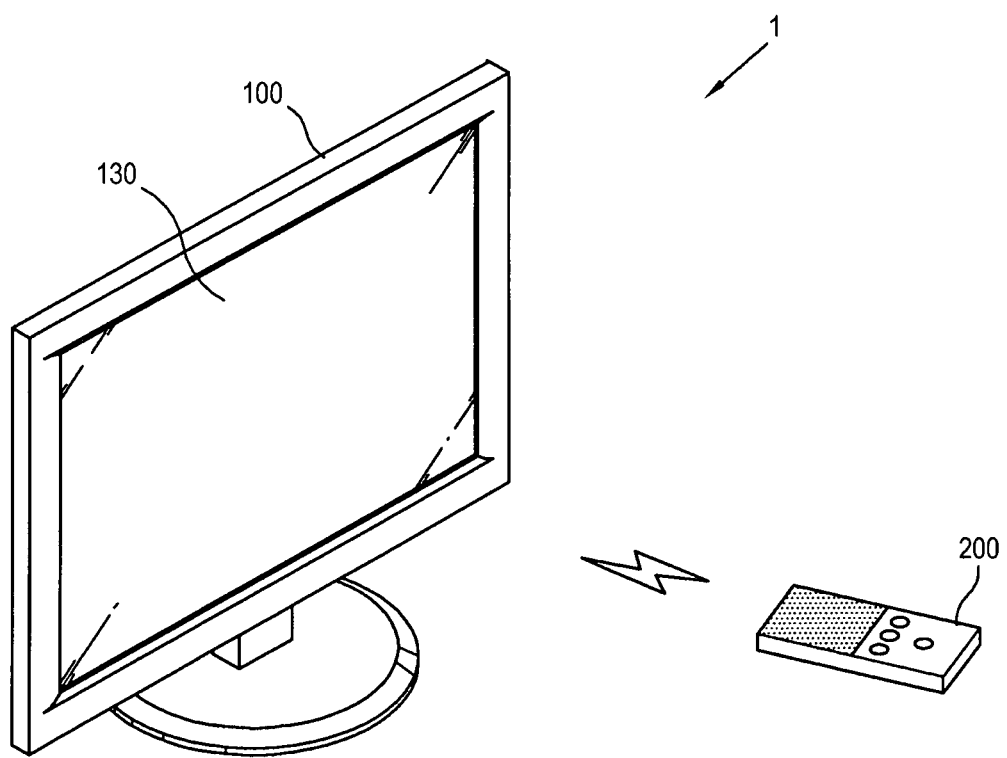
FIG. 1 illustrates an example of a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates an example of a display system according to an exemplary embodiment.

As shown in FIG. 1, a display system 1 includes a display apparatus 100 which processes an image signal according to a preset process and includes a display 130 which displays an image based on the processed image signal; and an input apparatus 200 which generates and transmits preset commands/data/information/signals to the display apparatus 100 to remotely control the display apparatus 100.

The present exemplary embodiment relates to the display system 1 in which the display apparatus 100 is implemented as a television (TV) for displaying a broadcasting image based on broadcasting signals/broadcasting information/broadcasting data transmitted by a transmission apparatus of a broadcasting station, and the input apparatus 200 is implemented as a remote controller. However, the type of an image displayed by the display apparatus 100 is not limited to the broadcasting image, and the display apparatus 100 may display various other types of images including video, still images, applications, on-screen display (OSD), and a user interface (UI) (hereinafter, to be also called graphic user interface (GUI)) based on signals/data supplied by various types of image supply sources (not shown).

The spirit of the exemplary embodiment may likewise apply to a display system which is different from the display system 1 of the present exemplary embodiment, e.g., apply to a system in which the display apparatus 100 is a monitor connected to a computer main body and the input apparatus 200 communicates with the computer main body. That is, it should be noted that the exemplary embodiment which will be described below is an example amenable to various modifications thereof depending on the embodiment type of the system, and does not limit the spirit of the exemplary embodiment thereto.

The input apparatus 200 is an external apparatus which is capable of performing wireless communication with the display apparatus 100. The wireless communication may include infrared (IR) communication, radio frequency (RF) communication, Bluetooth communication, etc. The input apparatus 200 transmits a preset command to the display apparatus 100 according to a user's manipulation. In FIG. 1, the input apparatus 200 is shown as a stand-alone remote controller. However, it will be appreciated by one of ordinary skill in the art that the input apparatus functionality may alternatively be provided in other types of devices, such as for example a mouse, keyboard, or game controller, etc. as long as the device is amendable to incorporation of a touch screen/sensor as described in more detail below.

The input apparatus 200 according to the present exemplary embodiment includes a touch sensor 210 to receive a user's touch input. According to the user's touch input information provided by the input apparatus 200, an image displayed on the display 130 of the display apparatus 100 may be controlled.

The input apparatus 200 according to the present exemplary embodiment may further include a motion sensor (not shown) to sense motion of a user, and a button input part (not shown) including number keys and menu keys, in addition to the touch sensor 210. The motion sensor may include a gyro sensor, angular velocity sensor, and geomagnetic sensor.

Figure 2:
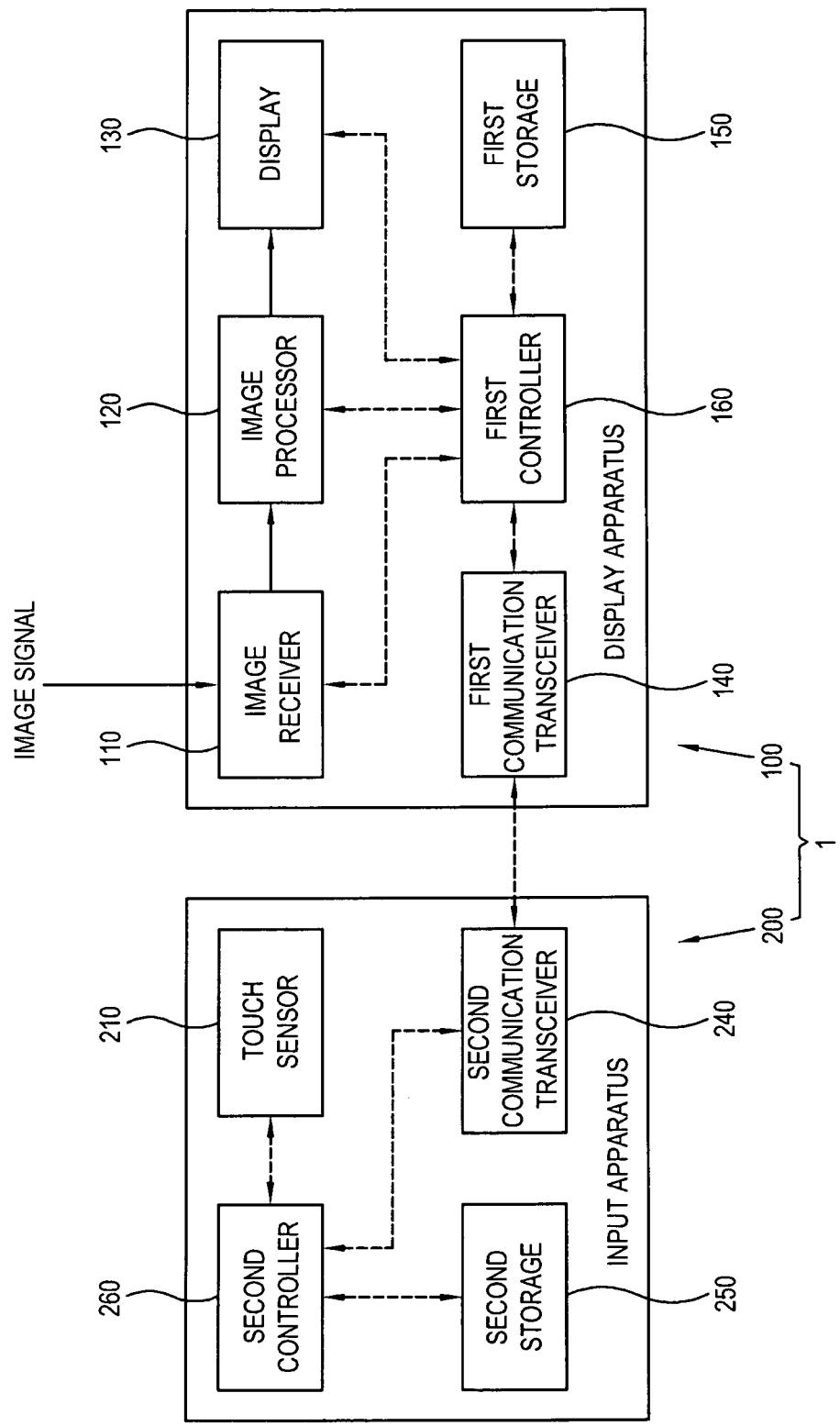
FIG. 2 is a block diagram of the display system of FIG. 1, according to an exemplary embodiment.

Hereinafter, configurations of the display apparatus 100 and the input apparatus 200 according to the present exemplary embodiment will be described in detail with reference to FIG. 2. FIG. 2 is a block diagram of the display system 1 according to an exemplary embodiment.

As shown in FIG. 2, the display apparatus 100 includes an image receiver 110 to receive an image signal, an image processor 120 to process an image signal received by the image receiver 110, the display 130 to display an image thereon based on an image signal processed by the image processor 120, a first communication transceiver 140 to communicate with the outside, a first storage 150 to store data therein, and a first controller 160 to control the display apparatus 100.

The input apparatus 200 includes the touch sensor 210 to receive a user's touch input, a second communication transceiver 240 to communicate with the outside, a second storage 240 to store data therein, and a second controller 260 to control the second communication transceiver 240 to thereby transmit a command to the display apparatus 100 corresponding to a sensing result of the touch sensor 210.

Hereinafter, a detailed configuration of the display apparatus 100 will be described.

The image receiver 110 receives and transmits an image signal to the image processor 120, and may be implemented as various types depending on a standard of a received image signal and an embodiment type of the display apparatus 100. For example, the image receiver 110 may receive an RF signal in a wireless manner from a broadcasting station (not shown) or receive image signals in a wired manner according to Composite video, Component Video, Super Video, SCART, and/or High Definition Multimedia Interface (HDMI) standards. If an image signal includes a broadcasting signal, the image receive 110 may include a tuner to tune a channel of the broadcasting signal.

The image signal may be input by an external apparatus, e.g., a personal computer (PC), an audio/video (AV) device, a smart phone and/or a smart pad. The image signal may result from data transmitted through a network such as the Internet. In this case, the display apparatus 100 may perform network communication through the first communication transceiver 140, or may further include an additional network communication part. The image signal may also result from data stored in the first storage 150 as a non-volatile memory such as a flash memory, hard disc drive, etc. The first storage 150 may be provided within or outside the display apparatus 100. If the first storage 150 is provided outside the display apparatus 100, the display apparatus 100 may further include a connector (not shown) to which the first storage 150 is connected.

The image processor 120 performs various image processing operations with respect to an image signal. The image processing operations may be preset. The image processor 120 outputs the processed image signal to the display 130 to display an image thereon based on the processed image signal. The image processor 120 may be implemented using one or more central processing units (CPUs) or one or more microprocessors, in conjunction with one or more memories.

The image processing operation of the image processor 120 may include, but not limited to, a decoding operation corresponding to various image formats, de-interlacing, frame refresh rate conversion, scaling, noise reduction for improving a quality of an image, detail enhancement, and/or line scanning, etc. The image processor 120 may be implemented as a group of individual elements for independently performing the aforementioned operations, or as a system-on-chip (SoC) which integrates the aforementioned operations.

The display 130 displays an image thereon based on an image signal processed by the image processor 120. The display 130 may be implemented as various displays such as a liquid crystal display (LCD), a plasma display panel (PDP), a light emitting diode (LED), an organic light emitting diode (OLED), a surface-conduction electron-emitter, a carbon nano-tube, and/or a nano-crystal, etc., but the display 130 is not particularly limited thereto.

The display 130 may further include additional elements depending on an embodiment type. For example, the display 130 implemented as an LCD may include an LCD panel (not shown), a backlight (not shown) emitting light to the LCD panel, and a panel driving substrate (not shown) driving the LCD panel.

The display 130 according to the present exemplary embodiment may display an icon thereon including a menu item of the display apparatus 100 as a user interface (UI). A user may manipulate the touch sensor 210 while viewing the menu item displayed on the display 130. The display 130 may display various contents thereon including web pages corresponding to the selection of the menu item by a user using the input apparatus 200.

The first communication transceiver 140 transmits commands, data, information, and/or signals from the input apparatus 200 to the image processor 120. The first communication transceiver 140 may further transmit commands, data, information, and/or signals from the first controller 160 to the input apparatus 200.

If a touch input is given by the input apparatus 100 to a setting area of a plurality of areas into which an input area of the touch sensor 210 is divided, the first communication transceiver 140 according to the present exemplary embodiment may receive a command corresponding to a change in one of coordinate values X and Y with respect to the touch input given to the setting area. The setting area will be described in more detail below.

The first communication transceiver 140 may apply wireless communication to a communication between the display apparatus 100 and the input apparatus 200. The wireless communication may include infrared (IR) communication, RF communication, Zigbee, Bluetooth, etc.

The first communication transceiver 140 according to the present exemplary embodiment is provided within the display apparatus 100, but is not particularly limited thereto. Alternatively, the first communication transceiver 140 may be implemented as a dongle or module and detachably mounted in a connector (not shown) of the display apparatus 100.

The first storage 150 stores therein data by a control of the first controller 160. The type and amount of data is not particularly limited. The first storage 150 is implemented as a non-volatile storage medium such as a flash memory, hard disc drive, etc. The first storage 150 is accessed by the first controller 160, which reads/writes/modifies/deletes/updates data stored in the first storage 150.

Data which is stored in the first storage 150 may include, e.g., an operating system (OS) for driving the display apparatus 100 as well as various applications executed on the OS, and image data and additional data.

The first storage 150 according to the present exemplary embodiment may further store therein operation information according to a change (increase or decrease) in one of coordinate values X and Y resulting from a touch input given to the setting area of the input apparatus 200 corresponding to a screen displayed on the display 130.

For example, the operation information may be set and stored to move a web page to a previous page or a next page corresponding to an increase or decrease in the coordinate value X, and to move a web page up and down corresponding to an increase or decrease in the coordinate value Y if the web page is displayed on the display 130. If setting menus of the display apparatus 100 are displayed on the display 130, a focus or pointer showing a currently selected menu of the setting menus may move up and down according to an increase or decrease in the coordinate X, and may move to the left and right sides according to an increase or decrease in the coordinate value Y. In the present exemplary embodiment, operation information may be stored as a table in the first storage 150 corresponding to various screens of the display 130.

The first controller 160 controls various elements of the display apparatus 100. For example, the first controller 160 controls the image processor 120 to process an image, and performs a control operation corresponding to a command given by the input apparatus 200 to thereby control overall operations of the display apparatus 100. The first controller 160 may be implemented using one or more central processing units (CPUs) or one or more microprocessors, in conjunction with one or more memories.

When a command corresponding to a user's touch input is input by the input apparatus 200 through the first communication transceiver 140, the first controller 160 according to the present exemplary embodiment controls the display 130 to display a corresponding image thereon.

If the command given by the input apparatus 200 is a touch input command to the setting area, i.e., a command to a change (increase or decrease) in one of the coordinate values X and Y, the first controller 160 may control the display 130 to change and display an image corresponding to the received command.

Upon receiving a command for increasing or decreasing one of the coordinate values X and Y from the input apparatus 200, the first controller 160 may change and display a screen of the display 130, depending on the currently displayed screen of the display 130, by referring to the operation information stored in the first storage 150. A detailed example of the changed display screen will be described later with reference to FIGS. 10 to 15.

Hereinafter, a detailed configuration of the input apparatus 200 will be described.

The input apparatus 200 according to the present exemplary embodiment operates in a touch mode in which the input apparatus 200 operates according to a user's touch input to the touch sensor 210. The operation mode of the input apparatus 200 according to the exemplary embodiment may further include a normal mode for operating according to a user's manipulation of a button, and a gesture mode for operating according to a motion given by the input apparatus 200. If there is a plurality of input modes of the input apparatus 200, the input modes may be changed according to a user's preset manipulation (e.g., manipulation of a predetermined key button, touch input given with predetermined intensity or given at a predetermined distance or more). However, the spirit of the present exemplary embodiment is not limited to the foregoing, and various other user inputs may apply.

The touch sensor 210 is implemented as a touch pad to sense a user's touch input, and may have an input area formed in an upper part thereof, and a touch sensing area formed in a lower part thereof. The type of the user's touch input may vary, including a tap, a click which is stronger than tap, a double click, a drag, a slide, and flicking. When the touch sensor 210 senses a user's touch input, the second controller 260 generates a command corresponding to the sensed touch input, and transmits the command to the display apparatus 100 through the second communication transceiver 240. The touch sensor 210 may sense a user's touch input which is given by a user's finger, or by a touch pen, stylus, etc.

The second communication transceiver 240 communicates with the display apparatus 100, and has communication standards corresponding to the first communication transceiver 140. For example, the second communication transceiver 240 transmits and receives a predetermined command using wireless communication which may include IR communication, RF communication, Zigbee, and/or Bluetooth, etc.

The second storage 250 stores therein various data which are accessed by the second controller 260. More specifically, the second storage 250 according to the present exemplary embodiment stores thereon information of a plurality of areas into which the input area of the touch sensor 210 is divided to sense a user's touch input, and coordinate information of the input area. The second storage 250 may further store therein information of the current input mode of the input apparatus 200 which is updated.

The second storage 250 may be implemented as a non-volatile storage medium such as a flash memory. The second storage 250 is accessed by the second controller 260, which reads/writes/modifies/deletes/updates data stored in the second storage 250.

The second controller 260 controls various elements of the input apparatus 200. For example, the second controller 260 senses various user's inputs and transmits corresponding commands to the display apparatus 100 through the second communication transceiver 240 to thereby control overall operations of the input apparatus 200. Therefore, the display apparatus 100 may perform a control operation corresponding to the commands. The second controller 260 may be implemented using one or more central processing units (CPUs) or one or more microprocessors, in conjunction with one or more memories.

The second controller 260 according to the present exemplary embodiment divides the input area of the touch sensor 210 into a plurality of areas, and recognizes at least one of the plurality of divided areas as the setting area. The second controller 260 sets coordinate information of the input area, and calculates coordinates of a location of the user's touch input sensed by the touch sensor 210. The second controller 260 transmits the calculated coordinate information as a predetermined command to the display apparatus 100 through the second communication transceiver 220.

FIGS. 3 to 9 illustrate examples of dividing the input area of the touch sensor 210 and giving a touch input to the setting area according to an exemplary embodiment.

Figure 3:
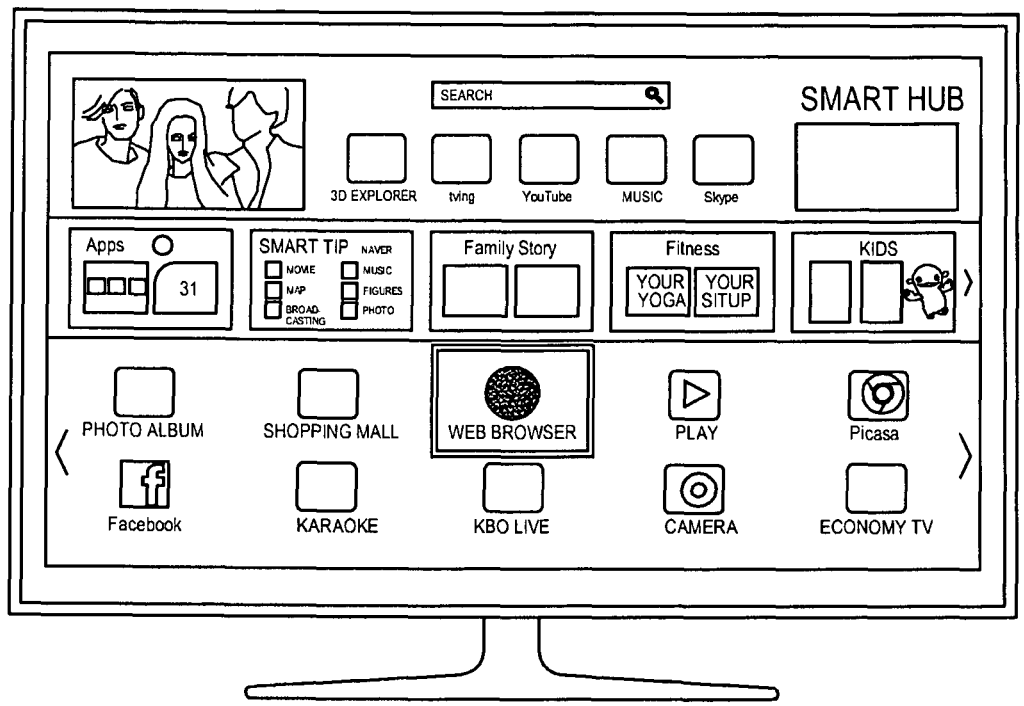
FIGS. 3 to 9 illustrate examples of dividing an input area of a touch sensor and giving a touch input to a setting area according to an exemplary embodiment.
Figure 3:
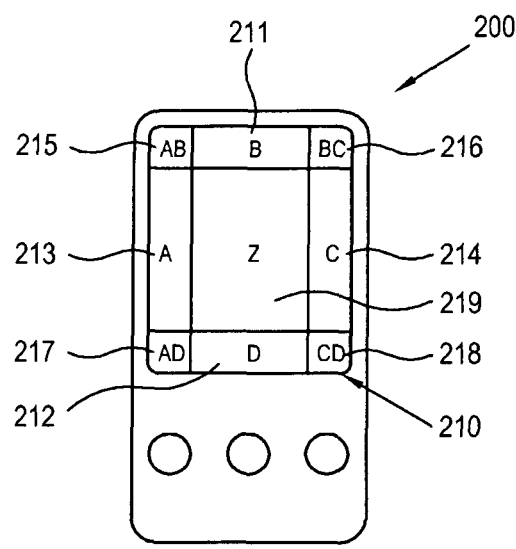

As shown in FIG. 3, in the present exemplary embodiment, the input area of the touch sensor 210 may be divided into a plurality of areas A 213, B 211, C 214, D 212, AB 215, AD 217, BC 216, CD 218 and Z 219, and a first area B 211, a second area D 212, a third area A 213, and a fourth area C 214, which are located at top, bottom, left and right sides of the input area, may be set as setting areas.

Figure 4:
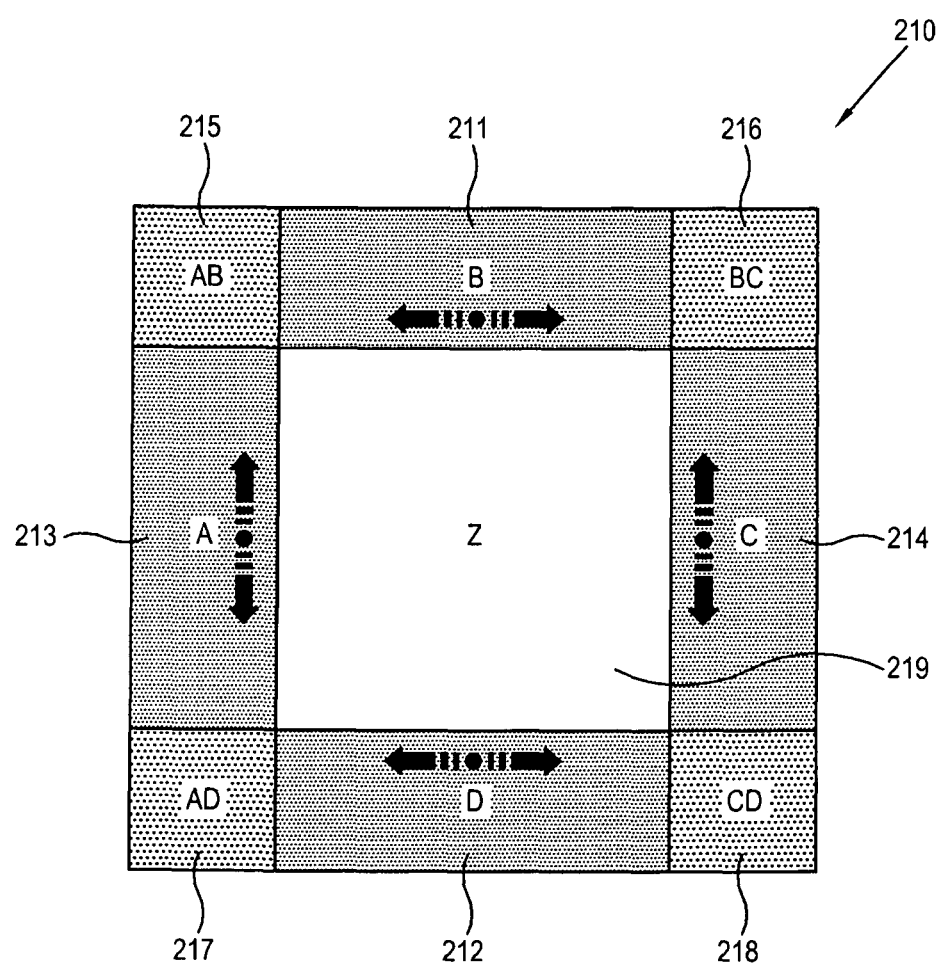

As shown in FIG. 4, the second controller 260 of the input apparatus 200 senses an increase or decrease in the coordinate value X with respect to a touch input given to the first area B 211 and the second area D 212 located at the top and bottom of the input area, and generates and transmits a corresponding command (event) to the display apparatus 100 through the second communication transceiver 240. Accordingly, the second controller 260 senses only the change in the coordinate value X, i.e., only left and right motion from the first area B 211 and the second area D 212.

The second controller 260 further senses an increase or decrease in the coordinate value Y with respect to a touch input given to the third area A 213 and the fourth area C 214 located at left and right sides of the input area, and generates and transmits a corresponding command (event) to the display apparatus 100 through the second communication transceiver 240. Accordingly, the second controller 260 senses only the change in the coordinate value Y, i.e., top and bottom motion from the third area A 213 and the fourth area C 214.

The user's touch input may include a drag input which moves a predetermined distance while keeping in touch with the touch sensor 210. The drag input may by input by pressing a finger (or touch pen) to the touch sensor 210, moving a predetermined distance and releasing the finger (or touch pen) from the touch sensor 210. The drag input may include a straight motion or a curved motion.

The second controller 260 may generate the following 8 commands (events) by determining whether a coordinate value of a pressed point, a coordinate value of a released point, and a coordinate value of the pressed and released point refer to an increase or decrease in the coordinate value X or Y:

(1) Command for increasing the coordinate value X in the first area B 211;
(2) Command for decreasing the coordinate value X in the first area B 211;
(3) Command for increasing the coordinate value X in the second area D 212;
(4) Command for decreasing the coordinate value X in the second area D 212;
(5) Command for increasing the coordinate value Y in the third area A 213;
(6) Command for decreasing the coordinate value Y in the third area A 213;
(7) Command for increasing the coordinate value Y in the fourth area C 214;
(8) Command for decreasing the coordinate value Y in the fourth area C 214.

Setting information of the 8 commands may be stored in advance in the second storage 250 corresponding to the respective setting areas 211 to 214. In the present exemplary embodiment, the display operation of the display apparatus 100 is intuitively controlled by the 8 commands generated as above, and a user may more conveniently manipulate the input apparatus 200. In the exemplary embodiment, four setting areas B 211, D 212, A 213, and C 214, and 8 commands are described. However, these numbers are only illustrative. For example, the number of setting areas may be increased to provide additional granularity of input. In such a case, the number of commands would increase accordingly.

The input area of the touch sensor 210 according to the present exemplary embodiment may further include at least one normal area. Referring to FIG. 3, the normal area may include a fifth area AB 215, a sixth area BC 216, a seventh area AD 217, and an eighth area CD 218 located at corners of the input areas and a ninth area Z 219 located at a center of the input areas. The fifth to eighth areas AB 215, BC 216, AD 217 and CD 218 are each formed by overlapping portions of two of the first to fourth areas B 211, D 212, A 213 and C 214, as shown in FIGS. 3-4. For example, the fifth area AB 215 is formed by overlapping a portion of the first area B 211 and a portion of the third area A 213 and is located at the top left corner of the input area.

When a touch input is given to the normal area, the second controller 260 senses the change in both the coordinate values X and Y with respect to the given touch input, and transmits a corresponding command to the display apparatus 100.

When a user's drag input is given to a plurality of areas, the second controller 260 according to the present exemplary embodiment senses a change (increase or decrease) in one of the coordinate values X and Y corresponding to setting information of the setting area including a pressed point.

Figure 5:
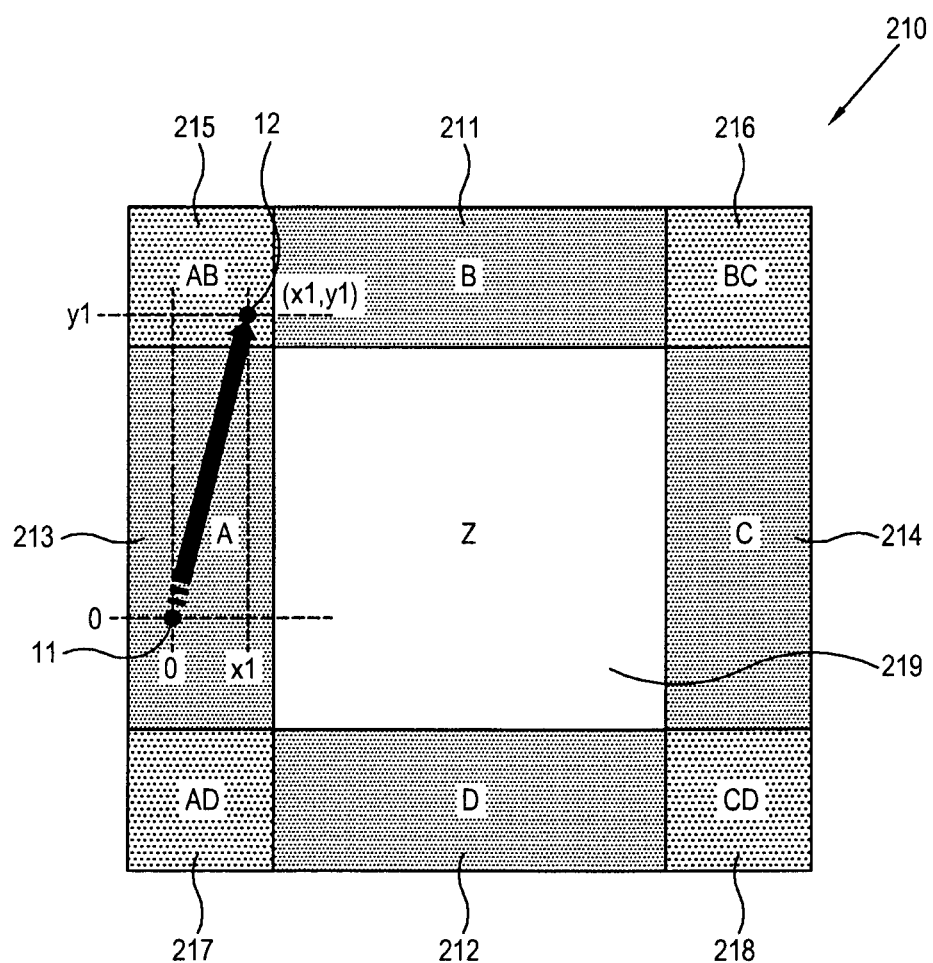

For example, as shown in FIG. 5, if a pressed point 11 as a starting point of the touch input is in the third area A 213, and a released point 12 as an end point thereof is in the fifth area AB 215, the second controller 216 senses an increase in the coordinate value Y according to the setting information of the third area A 213. Accordingly, the second controller 260 controls the second communication transceiver 240 to transmit a command to the display apparatus 100 corresponding to the increased value (+y1) of the coordinate value Y.

Figure 6:
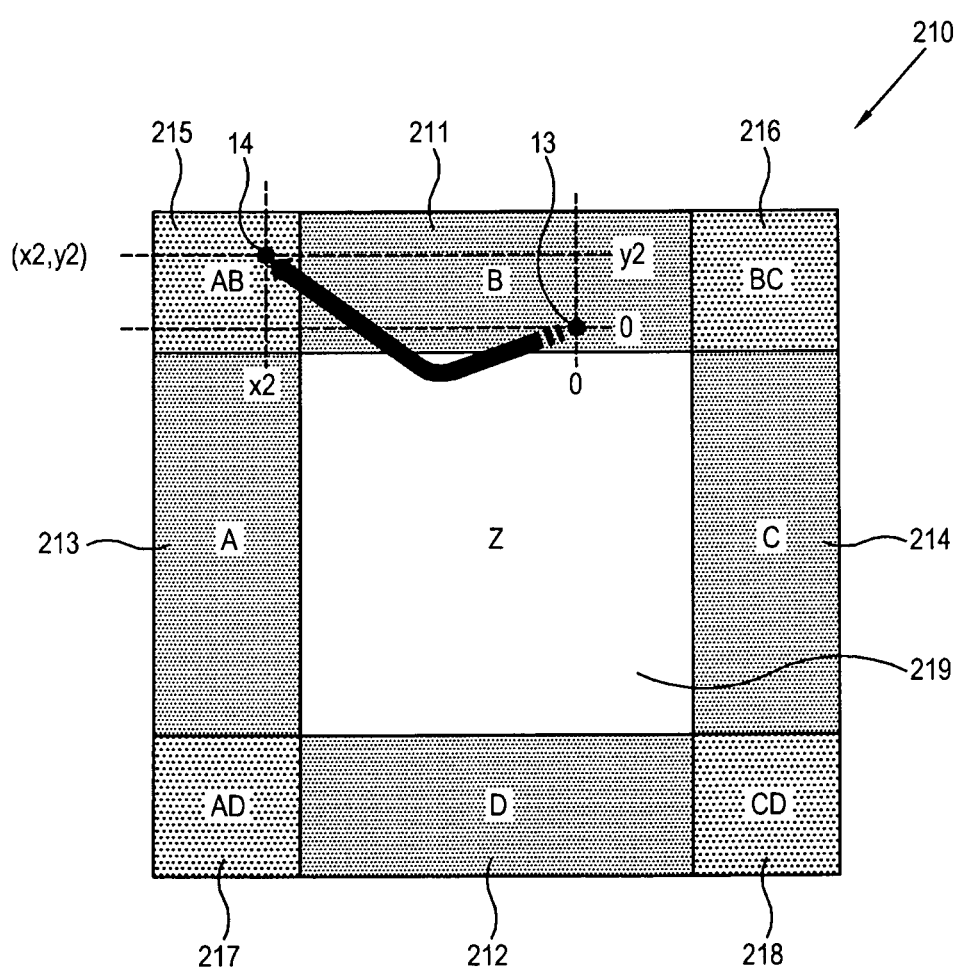

Likewise, as shown in FIG. 6, if a pressed point 13 as a starting point of the touch input is in the first area B 211, and a released point 14 as an end point thereof is in the fifth area AB 215, the second controller 216 senses a decrease in the coordinate value X according to the setting information of the first area B 211. Accordingly, the second controller 260 controls the second communication transceiver 240 to transmit a command to the display apparatus 100 corresponding to the decreased value (−x2) of the coordinate value X.

If a touch input (up or down) starting from (pressing at) the first area B 211 ends at (is released from) the first area B 211, the fifth area AB 215, or the sixth area BC 216, the second controller 260 according to the present exemplary embodiment may recognize the touch input as a valid drag input. Accordingly, the touch input in FIG. 6 becomes a valid input regardless of passing through the ninth area Z 219 while moving (dragging). If a touch input (up or down) pressing the first area B 211 is released from the ninth area Z 219, the second controller 216 does not recognize the touch input as a valid touch input and thus no operation is performed.

Similarly, a touch input starting from the second area D 212 is valid only if it ends at the second area D 212, the seventh area AD 217, or the eighth area CD 218. A touch input starting from the third area A 213 is valid only if it ends at the third areas A 213, the fifth area AB 215, or the seventh area AD 217. Lastly, a touch input starting from the fourth area C 214 is valid only if it ends at the fourth area C 214, the sixth area BC 216, or the eighth area CD 218.

Figure 7:
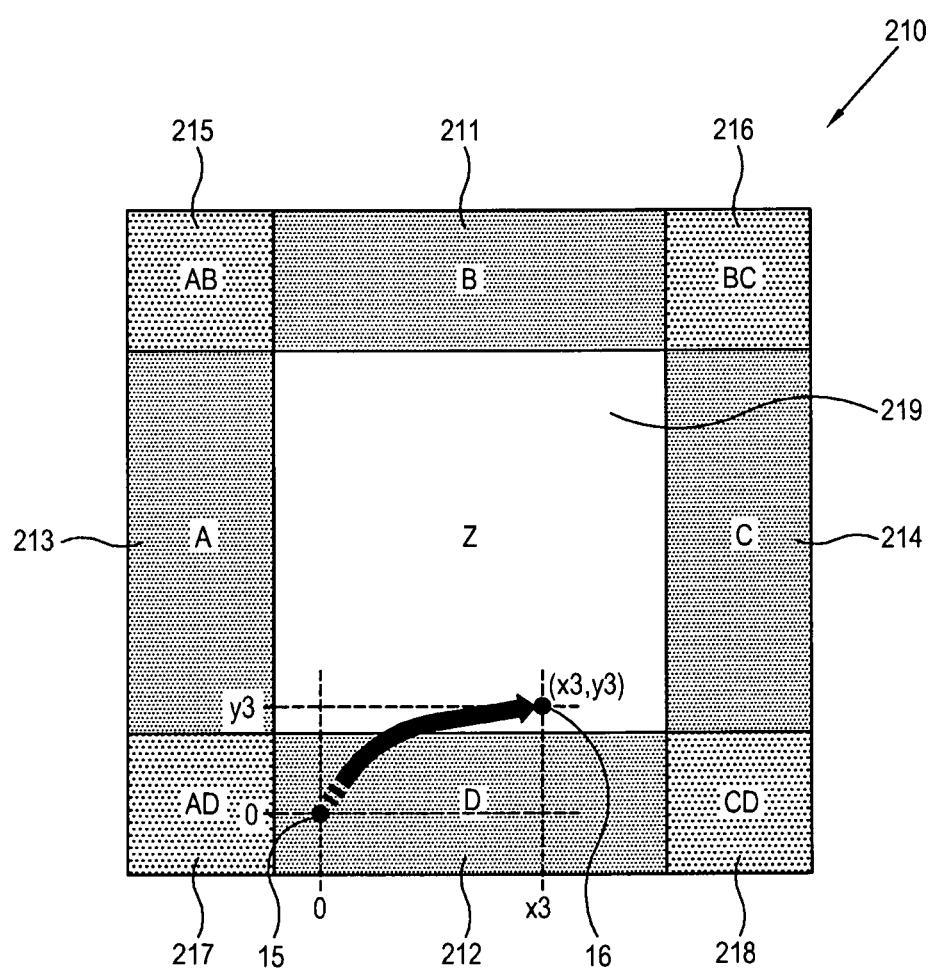

For example, as shown in FIG. 7, if a touch input pressing point 15 starting in the second area D 212 is released at a release point 16 in the ninth area Z 219, the second controller 260 disregards an increased value (+x3) of the coordinate value X even if the pressed second area D 212 is included in the setting area.

Figure 8:
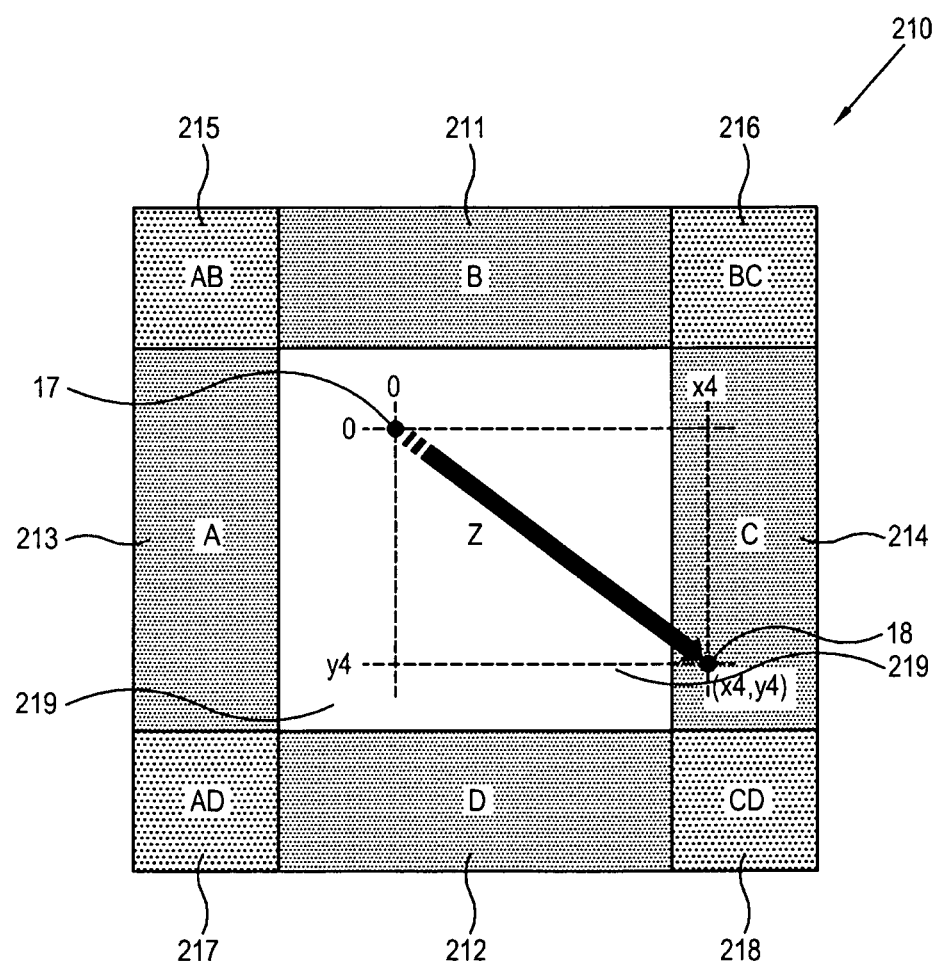

As shown in FIG. 8, if the ninth area Z 219 as a normal area is a pressed point 17 of a given touch input, the second controller 260 senses a changes in both the coordinate values X and Y of the touch input regardless of a location of the released point 18. Accordingly, the second controller 260 senses the increased value (+x4) and the decreased value (−y4) of the coordinate value X and transmits a corresponding command to the display apparatus 100.

Figure 9:
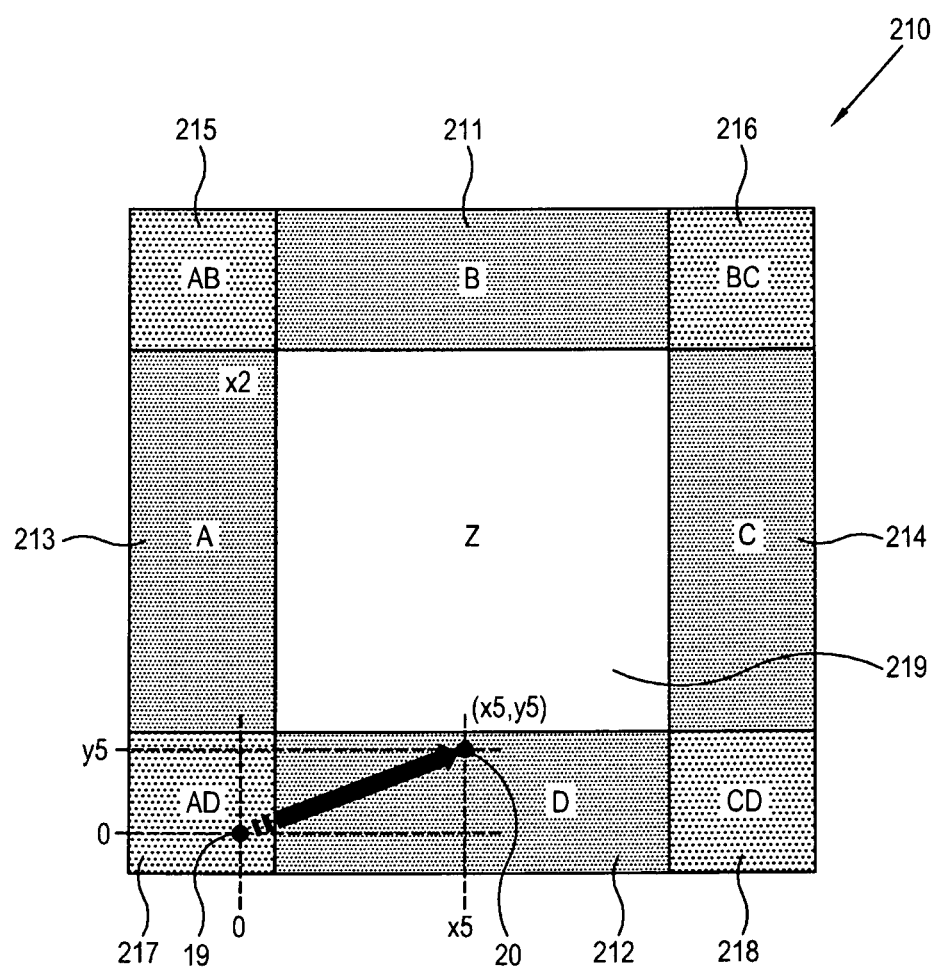

As shown in FIG. 9, if the seventh area AD 217 as a normal area is a pressed point 19 of a given touch input, the second controller 260 senses a change in both the coordinate values X and Y of the touch input regardless of a location of a released point 20. Accordingly, the second controller 260 senses both the increased value (+x5) of the coordinate value X and the increased value (+y5) of the coordinate value Y, and transmits a corresponding command to the display apparatus 100.

According to another exemplary embodiment, the fifth to eighth areas AB 215, BC 216, AD 217 and CD 218 may be included in the setting area. If the fifth to eighth areas AB 215, BC 216, AD 217 and CD 218 are included in the setting area, the second storage 150 may store therein setting information for recognizing a change in one of the coordinate values X and Y with respect to the fifth to eighth areas AB 215, BC 216, AD 217 and CD 218.

If the fifth to eighth areas AB 215, BC 216, AD 217 and CD 218 are included in the setting area, a drag input pressing one of the fifth to eighth areas AB 215, BC 216, AD 217 and CD 218 may be a valid input only if it is released from an area connected to the pressed area in a transverse or vertical direction. For example, only if a touch input pressing the fifth area AB 215 is released from the first area B 211, the sixth area BC 216, the third area A 213, and/or the seventh area AD 217, the second controller 260 may recognize the touch input as a valid input. Similarly, only if a touch input pressing the sixth area BC 216 is released from the first area B 211, the fifth area AB 215, the fourth area C 214, and/or the eighth area CD 218, the second controller 260 may recognize the touch input as a valid input. In respect to a pressed area in the seventh area AD 217 and the eighth area CD 218, the second controller 260 may recognize valid touch inputs in a similar manner, and thus repeated description will be omitted.

According to another exemplary embodiment, with respect to a drag input pressing one of the fifth to eighth areas AB 215, BC 216, AD 217 and CD 218, the second controller 260 may sense a change in both the coordinate values X and Y, compare the scope of the change (absolute value), generate a command corresponding to the larger value and transmit the command to the display apparatus 100. For example, if the seventh area AD 217 is the pressed point 19 of a given touch input and the second area D 212 is the released point 20 thereof as shown in FIG. 9, the second controller 260 may sense a change in both the coordinate values X and Y of the touch input. Accordingly, with the example input shown in FIG. 9, the second controller 260 senses both the increased value (+x5) of the coordinate value X and the increased value (+y5) of the coordinate value Y, and transmits to the display apparatus 100 a command corresponding to the increased value (+x5) of the coordinate value X which has been increased or decreased more (i.e., which has a larger absolute value) than the coordinate value Y.

FIGS. 10 to 15 illustrate screens which are displayed on the display 130 of the display apparatus 100 according to an exemplary embodiment.

Figure 10:
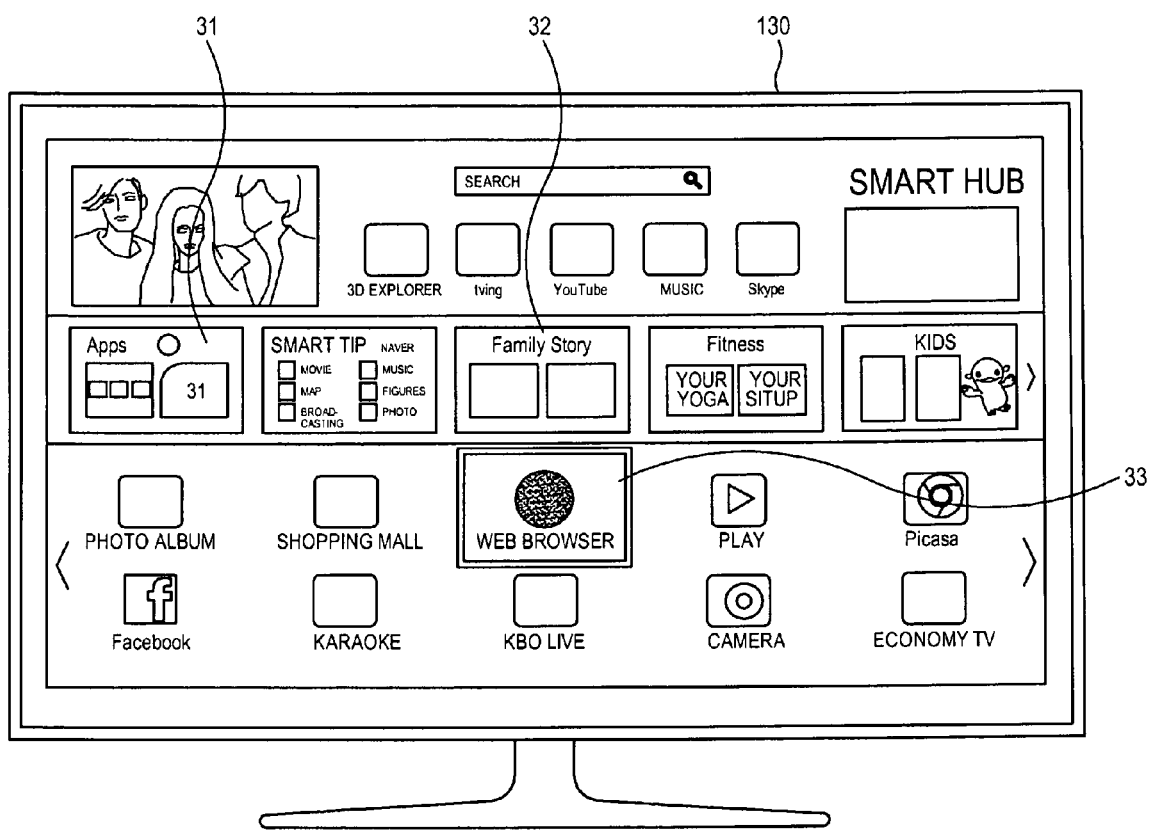
FIGS. 10 to 15 illustrate screens displayed on a display of the display apparatus according to an exemplary embodiment.

As shown in FIG. 10, setting menus 31, 32 and 33 of the display apparatus 100 are displayed on a screen of the display 130, and the first controller 160 controls the display 130 to emphasize and display a user's selection location through focus, pointer, cursor, highlight and/or flickering, etc. Thus, the currently selected menu 33 may be emphasized and displayed. For example, in FIG. 10, the menu "WEB BROWSER" is emphasized by the border.

A user may select one of the displayed setting menus by manipulating the touch sensor 210 of the input apparatus 200, and the first controller 160 may control the display 130 to change and display the screen corresponding to the command from the input apparatus 200.

More specifically, if a command for increasing the coordinate value X is given as a touch input to the first area B 211 or the second area D 212, the first controller 160 moves the pointer highlighting the selection menu to the right side. If a command for decreasing the coordinate value X is given, the first controller 160 moves the pointer to the left side. For example, if a command for increasing the coordinate value X is given while the pointer is located in the application item 31, the pointer may be moved toward the family story item 32 according to the increased value.

In the same manner, if a command for increasing the coordinate value Y is given as a touch input to the third area A 213 or the fourth area C 214, the first controller 160 moves the pointer highlighting the selection menu toward an upper portion of the display 130. If a command for decreasing the coordinate value Y is given, the first controller 160 moves the pointer toward a lower portion of the display 130. For example, if a command for decreasing the coordinate value Y is given while the pointer is located in the family story item 32, the pointer may be moved toward the web browser item 33 according to the decreased value.

A user may select the web browser item 33 by clicking the touch sensor 210 of the input apparatus 200 while the pointer is located in the web browser item 33 as in FIG. 10. The second controller 260 of the input apparatus 200 may generate and transmit a selection command to the display apparatus 100 regardless of whether the clicking location of the touch sensor 210 is the setting area or normal area of the input area.

Figure 11:
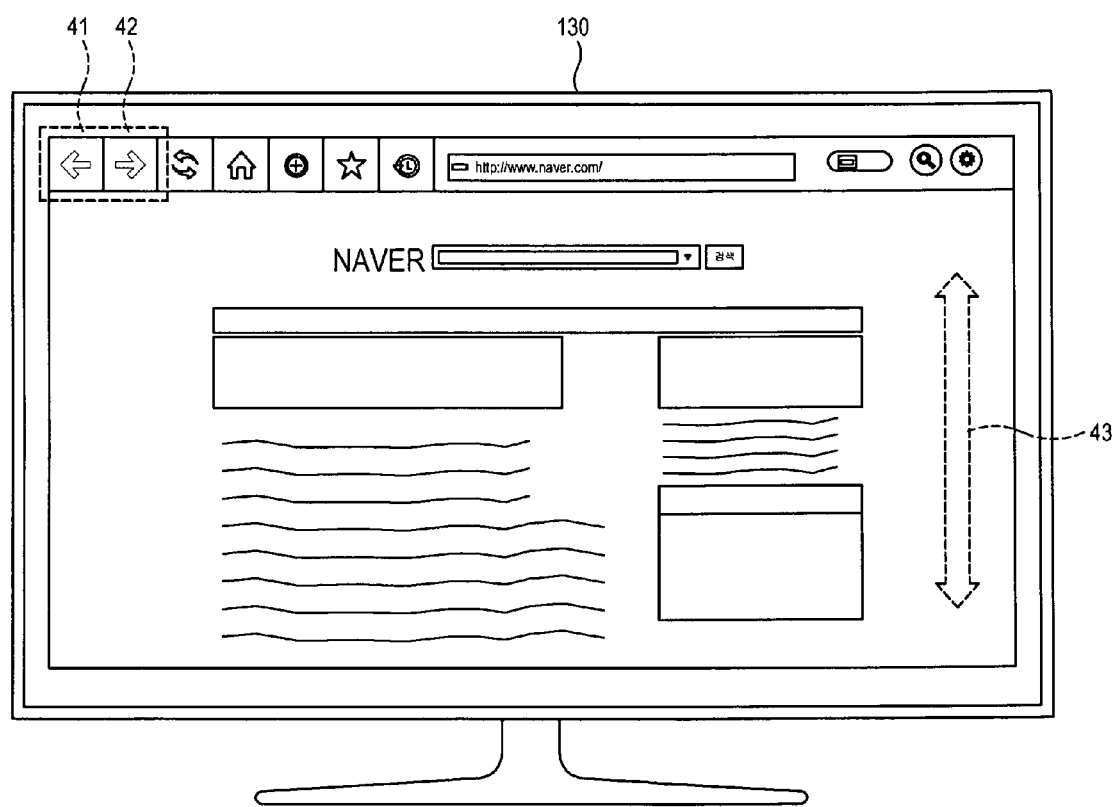

If the command for selecting the web browser item 33 is given, the first controller 160 displays a web browser on the display 130 as in FIG. 11.

As shown in FIG. 11, if a command for increasing the coordinate value X is given as a touch input to the first area B 211 or the second area D 212 while the web browser is displayed on the display 130, the first controller 160 moves the web browser to a next page and displays the next page. If a command for decreasing the coordinate value X is given thereto, the first controller 160 moves the web page to a previous page and displays the previous page. That is, the command for increasing the coordinate value X corresponds to the selection of the movement to the next page on the web browser screen in a similar way as clicking the next page item 42, while the command for decreasing the coordinate value X corresponds to the selection of the movement to the previous page on the web browser screen in a similar way as clicking the previous page item 41 from the web browser screen.

If a command for increasing the coordinate value Y is given as a touch input to the third area A 213 or the fourth area C 214, the first controller 160 moves the web page content up and displays the top of the web page. If a command for decreasing the coordinate value Y is given, the first controller 160 moves the web page content down and displays the bottom of the web page. That is, the command for increasing and decreasing the coordinate value Y may correspond to the scrolling up and down the web page by a user.

Thus, a user may select the menu item and move the web page by simply dragging from the setting areas (first to fourth areas B 211, D 212, A 213 and/or C 214) of the touch sensor 210 to the left and right sides and up and down, illustrative examples of which are shown in FIGS. 5-7, etc.

In the present exemplary embodiment, a user may more quickly and conveniently select items 51, 52, 53, 54 and 55 and/or sub items 61, 62, 63, 64, 65, 66, 67 and 68 of the setting menu as shown in FIGS. 12 to 15 by a touch input to the setting area.

More specifically, the first controller 160 may receive a command for decreasing the coordinate value X as a touch input to the first area B 211 or the second area D 212 and sequentially display screens in FIGS. 12 to 15 on the display 130. Thus, a user may promptly obtain a feedback of a touch input to the first area B 211 or the second area D 212 of the touch sensor 210. The display 130 emphasizes and displays, through a pointer, a currently selected item 51 (see FIG. 12) out of the items 51, 52, 53, 54 and 55, and a currently selected sub item 61 (see FIG. 12) out of the sub items of the setting menu. While the communication item 51 is selected as in FIG. 12, a user may manipulate the normal area such as the ninth area Z 219 of the touch sensor 210 and select the sub items 61, 62 and/or 63.

Figure 12:
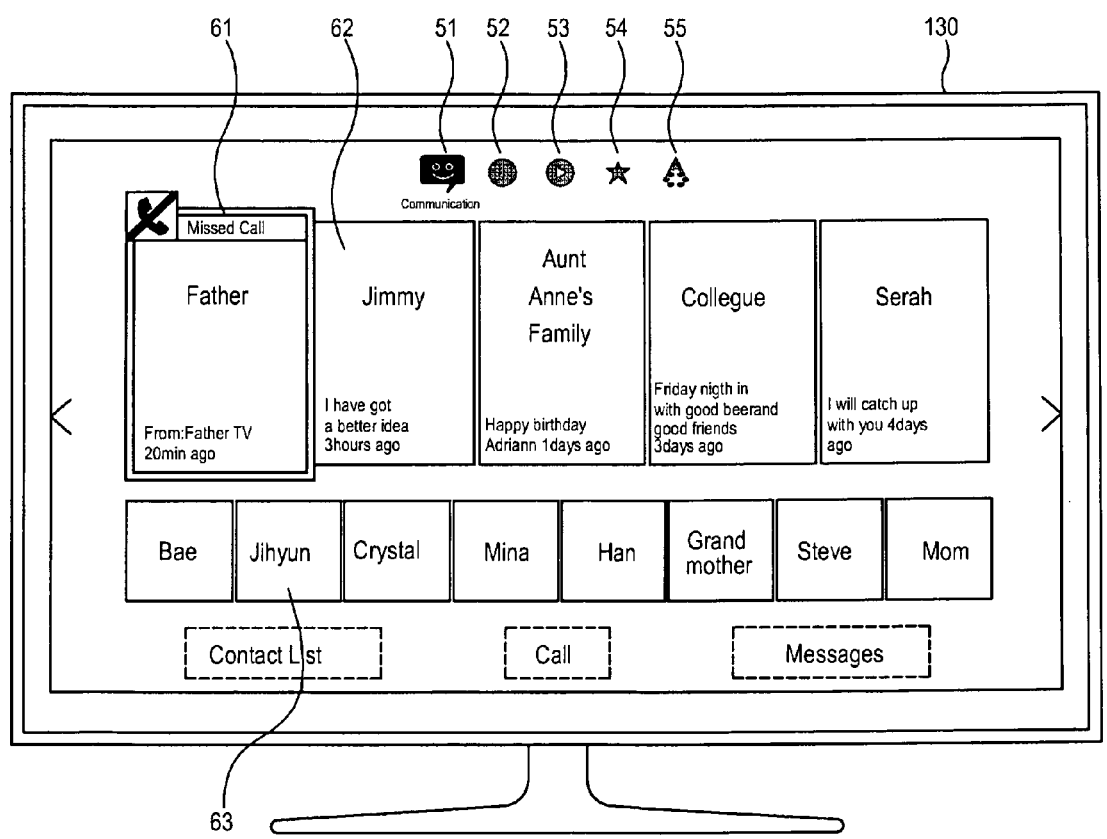
Figure 13:
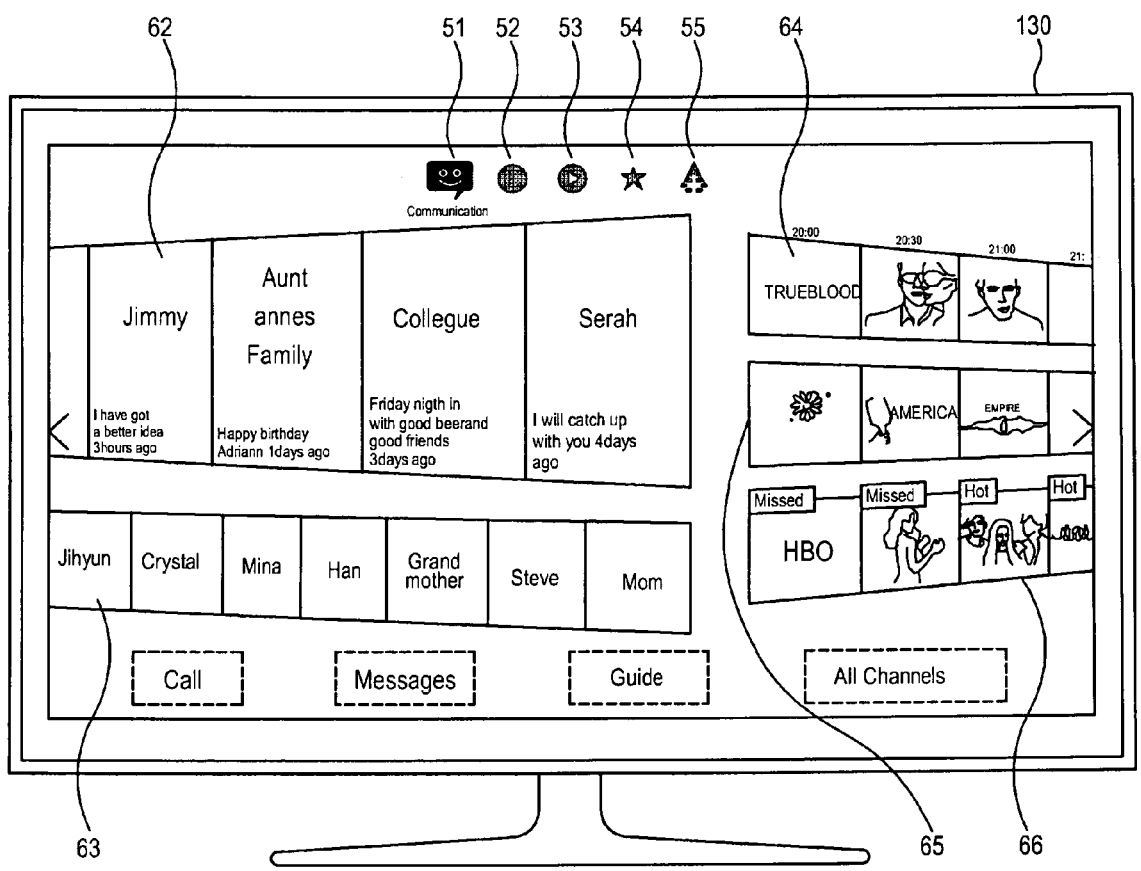
Figure 14:
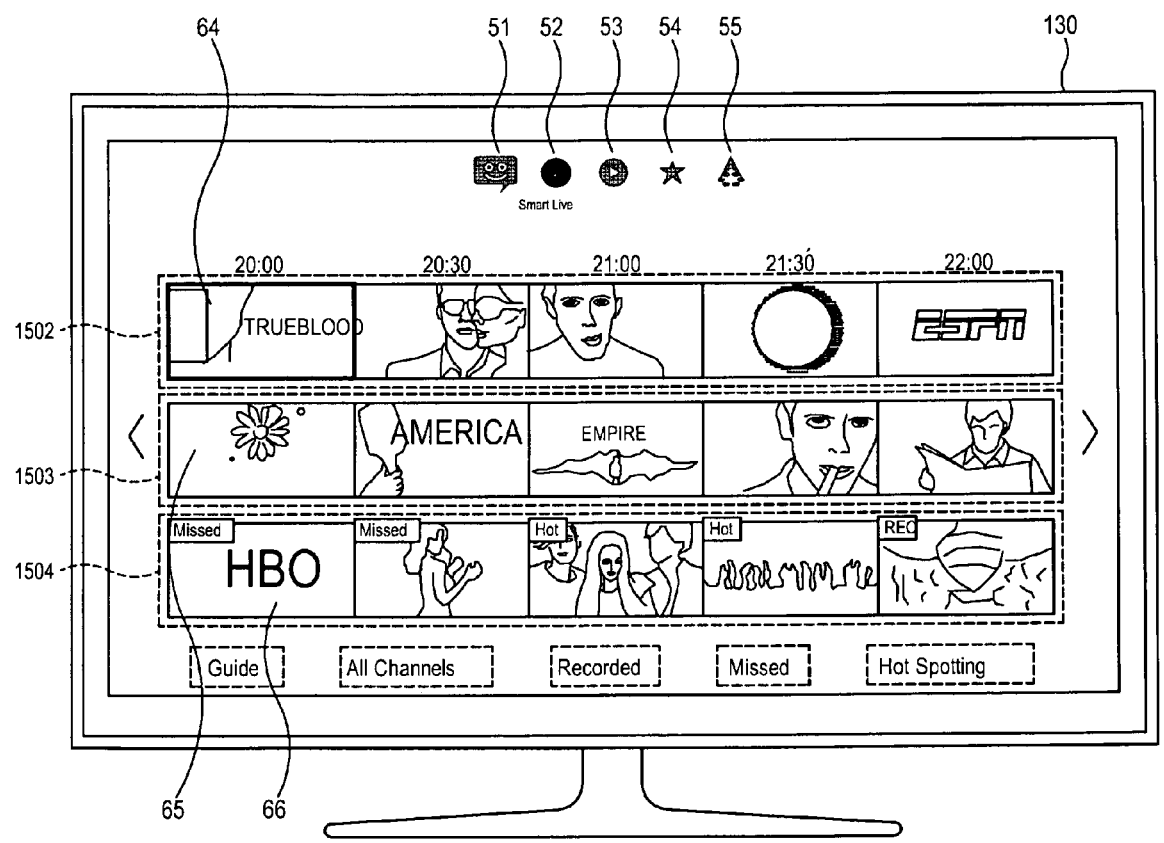

If a user manipulates (e.g. drags a touch press to the left side) the first area B 211 or the second area D 212 of the touch sensor 210 in FIG. 12, the selection item is moved to the smart live item 52 as shown in FIGS. 13 and 14, and sub items 64, 65 and 66 of the smart live item 52 are displayed together on the display 130.

Figure 15:
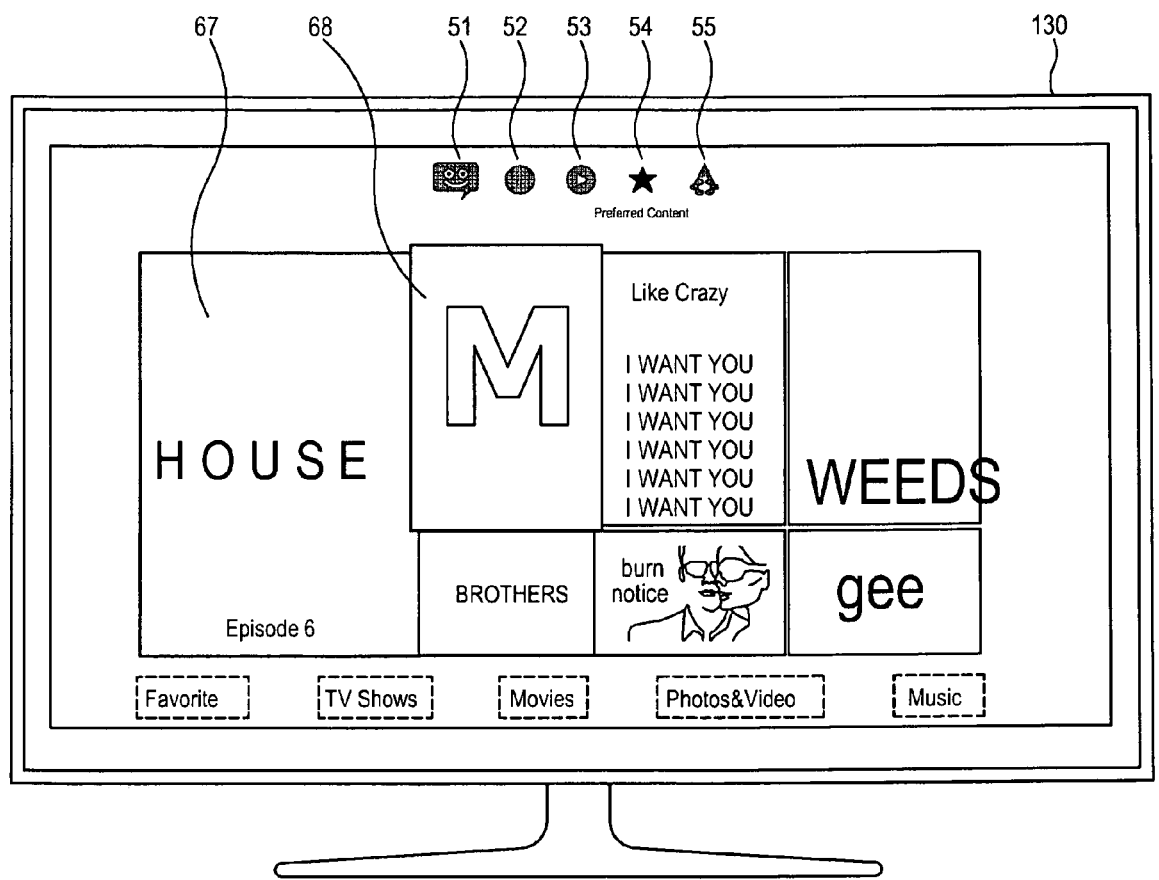

Likewise, if a user manipulates (e.g. drags a touch press to the left side) the first area B 211 or the second area D 212 of the touch sensor 210 in FIG. 14 twice, the selection item is moved to the favorite content item 54 as in FIG. 15, and sub items 67 and 68 of the favorite content item 54 are displayed together on the display 130. That is, on the first manipulation, the play content item 53 would be moved to, and then after the second manipulation in the same direction, the favorite content item 54 as in FIG. 15 will be moved to.

In FIGS. 14 and 15, a user may likewise manipulate the normal area such as the ninth area Z 219 of the touch sensor 210 and select the sub items 64, 65, and/or 66, or 67 and/or 68, respectively.

In the foregoing exemplary embodiment, the menu item is moved or selected or the web browser is moved or changed corresponding to the command for increasing or decreasing one of the coordinate values X and Y with respect to the touch input to the setting area. However, the command which is given according to the manipulation of the setting area is not limited to the foregoing.

For example, in another exemplary embodiment, a channel may be changed corresponding to a command for increasing or decreasing the coordinate value X of the first to fourth areas B 211, D 212, A 213 and C 214 as the setting areas, and a volume may be adjusted corresponding to a command for increasing or decreasing the coordinate value Y of the third area A 213 or the fourth area C 214.

In another exemplary embodiment, an OSD may be displayed together with a slide effect from a top edge of the display 130 corresponding to a command for decreasing the coordinate value Y with respect to the first area B 211 while an image is displayed, and may be displayed together with the slide effect from a bottom edge of the display 130 corresponding to a command for increasing the coordinate value Y to the second area D 212. In the same manner, the OSD may be displayed together with the slide effect from a left edge of the display 130 corresponding to a command for increasing the coordinate value X to the third area A 213, and may be displayed together with the slide effect from a right edge of the display 130 corresponding to a command for decreasing the coordinate value X to the fourth area C 214.

Hereinafter, a control method of the input apparatus 200 and the display apparatus 100 according to an exemplary embodiment will be described with reference to drawings.

Figure 16:
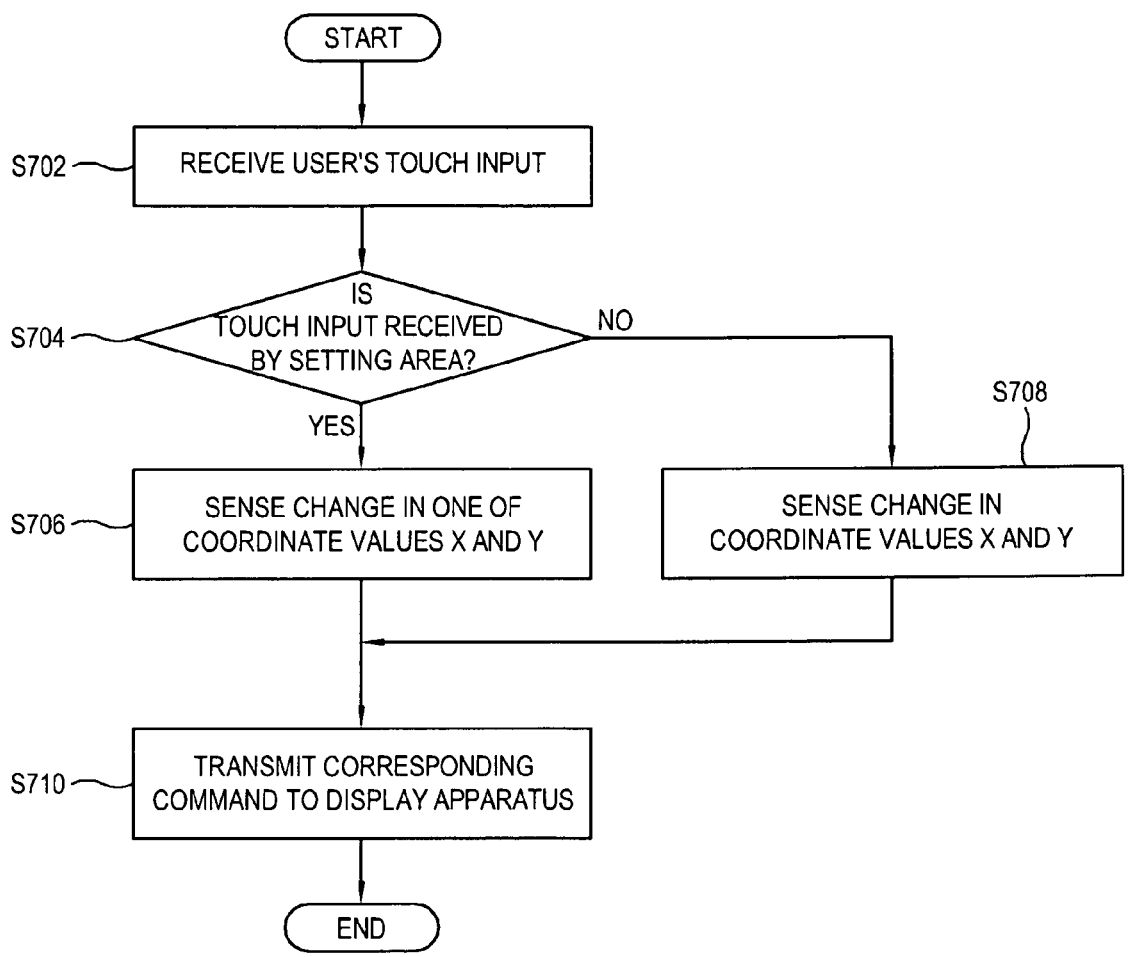
FIG. 16 is a flowchart showing a control method of an input apparatus according to an exemplary embodiment.

FIG. 16 is a flowchart showing a control method of the input apparatus 200 according to an exemplary embodiment.

As shown in FIG. 16, the input apparatus 200 may receive a user's input to the touch sensor 210 (S702).

The second controller 260 determines whether the touch input given at operation S702 is a drag input that is received by one of the setting areas, e.g., the first to fourth areas B 211, D 212, A 213 and/or C 214 (S704). The second controller 260 may determine whether the pressed point of the drag input is included in the setting areas.

If the touch input is received by one of the setting areas (YES in operation S704), the second controller 260 senses the change in one of the coordinate values X and Y to the touch input given at operation S702 (S706).

If the touch input is not received by one of the setting areas (NO in operation S704), i.e., is received by the normal area, the second controller 260 senses the change in both the coordinate values X and Y (S708). The normal area may be the ninth area Z 219, or alternatively may further include the fifth to eighth areas AB 215, BC 216, AD 217 and CD 218. However, the fifth to eighth areas AB 215, BC 216, AD 217 and CD 218 may alternatively be included in the setting area as the case may be. That is, the fifth to eighth areas AB 215, BC 216, AD 217 and CD 218 may be included in the normal area or the setting area.

The second controller 260 transmits to the display apparatus 100 the command corresponding to the change sensed at operation S706 or S708 (S710).

Figure 17:
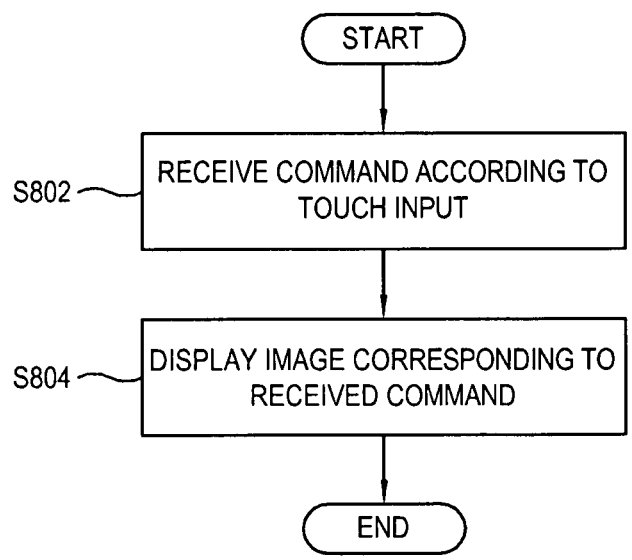
FIG. 17 is a flowchart showing a control method of the display apparatus according to an exemplary embodiment.

FIG. 17 is a flowchart showing a control method of the display apparatus 100 according to an exemplary embodiment.

As shown in FIG. 17, the display apparatus 100 may receive a command with respect to the touch input transmitted by the input apparatus 200 (S802). The received command may be a drag input into one of the first to fourth areas B 211, D 212, A 213 and C 214 as the setting areas, and may correspond to an increase or decrease in one of the coordinate values X and Y.

The first controller 160 displays an image on the display 130 corresponding to the command received at operation S802 (S804). For example, if a web page is displayed on the display 130, the first controller 160 may control the display 130 to move the web page to the previous or next page corresponding to the command for increasing or decreasing the coordinate value X, and/or to move the web page to the top or bottom thereof corresponding to the command for increasing or decreasing the coordinate value Y. On the other hand, if a setting menu is displayed on the display 130, the pointer located in the selected setting menu may be moved corresponding to the command for increasing or decreasing one of the coordinate values X and Y.

According to one or more exemplary embodiments described above, the input area of the input apparatus 200 is divided into a plurality of areas, and a command for increasing or decreasing one of the coordinate values X and Y is transmitted to the display apparatus 100 with respect to the touch input given to the setting areas, and thus commands input by the input apparatus 200 may vary.

Also, the display apparatus 100 promptly changes and displays an image according to a received command, and allows a user to easily control the display screen without viewing the input apparatus 200 and to enjoy more convenience.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
a display configured to display an image thereon;
a communication transceiver configured to receive touch information regarding touch coordinate values from an external input apparatus comprising a touch pad; and
a controller configured to:
determine a pointing position in the display based on the received touch information,
determine that an initial touch occurs in a first area of the touch pad based on the received touch information, the first area being a top corner area of the touch pad,
determine that a touch drag following the initial touch is released in a second area of the touch pad based on the received touch information, the second area being a top horizontally extending area of the touch pad that is adjacent to the first area, and the second area being associated with a predetermined function, and
perform the predetermined function in response to determining that the initial touch occurs in the first area and the touch drag following the initial touch is released in the second area,
wherein the controller is further configured not to perform the predetermined function in response to determining that the initial touch occurs in the first area and the touch drag following the initial touch is released in a central area of the touch pad outside of the first and second areas.

2. The display apparatus according to claim 1, wherein the predetermined function corresponds to a channel changing function, and the controller is configured to perform no function in response to determining that the initial touch occurs in the first area and the touch drag following the initial touch is released in the central area of the touch pad outside of the top horizontally extending area.

3. The display apparatus according to claim 2, wherein the controller is configured to, when touch information received from the external input apparatus corresponds to a horizontal touch drag input moving in a first direction along the top horizontally extending area of the touch pad, perform a channel up operation, and
the controller is configured to, when touch information received from the external input apparatus corresponds to a horizontal touch drag input moving in a second direction, opposite to the first direction, along the top horizontally extending area of the touch pad, perform a channel down operation.

4. The display apparatus according to claim 2, wherein the controller is configured to, when touch information received from the external input apparatus corresponds to a vertical touch drag input moving in a vertical direction along a vertically extending area of the touch pad, perform a volume changing function.

5. The display apparatus according to claim 2, wherein the received touch information corresponds to an increase or a decrease in a coordinate values X of the top horizontally extending area at which the horizontal touch drag input is received.

6. A display system which comprises a remote control unit and a display apparatus, the display system comprising:
the remote control unit comprising:
a first communication transceiver which is configured to communicate with the display apparatus;
a touch pad which is configured to receive a touch input; and
a first controller which is configured to control the first communication transceiver to transmit a touch information to the display apparatus,
the display apparatus comprising:
a display configured to display an image thereon;
a second communication transceiver configured to receive the touch information regarding touch coordinate values from an external input apparatus comprising a touch pad; and
a second controller configured to:
determine a pointing position in the display based on the received touch information,
determine that an initial touch occurs in a first area of the touch pad based on the received touch information, the first area being a top corner area of the touch pad,
determine that a touch drag following the initial touch is released in a second area of the touch pad based on the received touch information, the second area being a top horizontally extending area of the touch pad that is adjacent to the first area, and the second area being associated with a predetermined function, and
perform the predetermined function in response to determining that the initial touch occurs in the first area and the touch drag following the initial touch is released in the second area,
wherein the second controller is further configured not to perform the predetermined function in response to determining that the initial touch occurs in the first area and the touch drag following the initial touch is released in a central area of the touch pad outside of the first and second areas.

7. The display system according to claim 6, wherein the predetermined function corresponds to a channel changing function, and the second controller is configured to perform no function in response to determining that the initial touch occurs in the first area and the touch drag following the initial touch is released in the central area of the touch pad outside of the top horizontally extending area.

8. The display system according to claim 7, wherein the second controller is configured to, when touch information received from the external input apparatus corresponds to a horizontal touch drag input moving in a first direction along the top horizontally extending area of the touch pad, perform a channel up operation, and
the second controller is configured to, when touch information received from the external input apparatus corresponds to a horizontal touch drag input moving in a second direction, opposite to the first direction, along the top horizontally extending area of the touch pad, perform a channel down operation.

9. The display system according to claim 7, wherein the second controller is configured to, when touch information received from the external input apparatus corresponds to a vertical touch drag input moving in a vertical direction along a vertically extending area of the touch pad, perform a volume changing function.

10. A remote control unit comprising:
a communication transceiver which is configured to communicate with a display apparatus;
a touch pad which is configured to receive a touch input regarding touch coordinate values; and
a controller which is configured to control the communication transceiver to transmit a touch information to the display apparatus,
the controller being configured to:
determine a pointing position in a display of the display apparatus based on the received touch input,
determine that an initial touch occurs in a first area of the touch pad based on the received touch input, the first area being a top corner area of the touch pad,
determine that a touch drag following the initial touch is released in a second area of the touch pad based on the received touch input, the second area being a top horizontally extending area of the touch pad that is adjacent to the first area, and the second area being associated with a predetermined function, and
transmit a command to perform the predetermined function in response to determining that the initial touch occurs in the first area and the touch drag following the initial touch is released in the second area,
wherein the controller is further configured not to transmit a command in response to determining that the initial touch occurs in the first area and the touch drag following the initial touch is released in a central area of the touch pad outside of the first and second areas.

11. The remote control unit according to claim 10, wherein the predetermined function corresponds to a channel changing function, and the controller is configured not to transmit a command in response to determining that the initial touch occurs in the first area and the touch drag following the initial touch is released in the central area of the touch pad outside of the top horizontally extending area.

12. The remote control unit according to claim 11, wherein the controller is configured to, when touch information received from the remote control unit corresponds to a horizontal touch drag input moving in a first direction along the top horizontally extending area of the touch pad, transmit a command to perform a channel up operation, and
the controller is configured to, when touch information received from the remote control unit corresponds to a horizontal touch drag input moving in a second direction, opposite to the first direction, along the top horizontally extending area of the touch pad, transmit a command to perform a channel down operation.

13. The remote control unit according to claim 11, wherein the controller is configured to, when touch information received from the external input apparatus corresponds to a vertical touch drag input moving in a vertical direction along a vertically extending area of the touch pad, perform a volume changing function.

14. The remote control unit according to claim 10, wherein the controller is configured to sense an increase or a decrease in a coordinate value X in response to the touch pad receiving a touch input in the horizontally extending area.

15. The remote control unit according to claim 10, further comprising a storage which is configured to store setting information of the plurality of areas.

16. The remote control unit according to claim 10, wherein the touch drag following the initial touch comprises a press on the touch pad, a move across the touch pad while maintaining pressure in the touch pad, and releasing the press at a touch point at an end of the move in the horizontally extending area.

17. The remote control unit according to claim 11, wherein the controller senses a change in both coordinate values X and Y in response to the touch pad receiving a touch input in the central area.

18. The remote control unit according to claim 17, wherein the central area is located at a center of the touch pad.

* * * * *